United States Patent
Maurer

(10) Patent No.: US 7,617,765 B2
(45) Date of Patent: Nov. 17, 2009

(54) FRYING DEVICE

(76) Inventor: Ulrich Maurer, Alte Winterthurerstrasse 78, CH-8304 Wallisellen (CH)

( * ) Notice: Subject to any disclaimer, the term of this patent is extended or adjusted under 35 U.S.C. 154(b) by 372 days.

(21) Appl. No.: 10/523,962

(22) PCT Filed: Jul. 28, 2003

(86) PCT No.: PCT/CH03/00512

§ 371 (c)(1),
(2), (4) Date: Apr. 11, 2005

(87) PCT Pub. No.: WO2004/014206

PCT Pub. Date: Feb. 19, 2004

(65) Prior Publication Data

US 2006/0021516 A1    Feb. 2, 2006

(30) Foreign Application Priority Data

Aug. 9, 2002  (CH) .................... 1386/02

(51) Int. Cl.
*A47J 37/12* (2006.01)
(52) U.S. Cl. ............... 99/404; 99/330; 99/407; 99/409; 99/416

(58) Field of Classification Search ........... 99/403–418, 99/444–450, 348, 427, 330; 366/220, 224, 366/233, 234; 210/DIG. 8; 219/430; 126/377.1, 126/376.1, 378.1

See application file for complete search history.

(56) References Cited

U.S. PATENT DOCUMENTS

| 5,341,729 | A  | * | 8/1994 | Zittel ..................... 99/348 |
| 6,205,913 | B1 | * | 3/2001 | Zittel et al. .............. 99/348 |
| 6,523,457 | B1 | * | 2/2003 | Ancona et al. ............ 99/330 |
| 6,807,900 | B2 | * | 10/2004 | Iori ..................... 99/404 |
| 6,834,577 | B2 | * | 12/2004 | Xu ....................... 99/409 |
| 7,030,341 | B2 | * | 4/2006 | Maurer .................. 219/430 |

FOREIGN PATENT DOCUMENTS

DE   3904008 A1 * 8/1990

* cited by examiner

*Primary Examiner*—Timothy F. Simone
(74) *Attorney, Agent, or Firm*—Bachman & LaPointe, P.C.

(57) ABSTRACT

The replacement of used cooking fat in frying devices which comprise a container for the items which are to be cooked and a cooking device, i.e. a frying drum, requires a considerable amount of time and cleaning energy. The loss of cooking fat can also soil the place where the frying machine is installed. The invention thus relates to a frying device whereby the disadvantages of the known frying devices with a cooking fat outlet are avoided since the cooking drum, in the inventive frying device, is exchanged with the cooking fat.

9 Claims, 4 Drawing Sheets

US 7,617,765 B2

FRYING DEVICE

BACKGROUND OF THE INVENTION (1) Field of the Invention

The invention relates to a frying device for the baking while swimming of portions of foodstuffs, pastries and similar, especially in pieces of individual portions in accordance with the preamble of Claim 1 hereinbelow.

(2) Prior Art

Baking while swimming is understood as referring to the preparation of foodstuffs or pastries and similar (hereinafter jointly referred to as foodstuffs) and is characterized in that the foodstuffs are refined while swimming in hot fat, i.e. baked in a manner appropriate for consumption. The term "frying" has also asserted itself for this type of foodstuff preparation, while "frying device" has asserted itself for the equipment employed therefor and will be used hereinafter in the description of the invention. The frying device in accordance with the invention is particularly intended for the preparation of heaped assemblies made up of strip-shaped pieces of more or less identical size.

A heaped assembly of the described type frequently intended for consumption is made from potatoes and is prepared for consumption by frying. Such heaped assemblies are generally known as "portions of potato chips".

For the production of portions of potato chips there is known a device that produces these chips in a self-active or automatic manner from a heaped assembly of crude or pre-cooked potato pieces. To this end the known device essentially comprises a storage container for the crude potato chips and a frying drum, the storage container communicating with the frying drum by means of a pipe connection.

A ladling device acting in the storage container constitutes a heaped assembly of a predetermined quantity and transfers this into the pipe that conveys the heaped assembly into the frying drum. In the frying drum the heaped assembly is cooked in hot oil and thereafter is removed from the frying drum.

In the frying drum containing liquid cooking fat there rotates a manipulator (or agitator) that along its circumference is provided with rakes that project in a radial direction and are arranged at equal spacings; these rakes guide the heaped assembly through the hot cooking fat and subsequently remove it from the device. The cooking fat becomes consumed when this is done and must therefore be periodically replaced. The replacement takes place by means of an outlet tap (faucet) that eliminates the old cooking fat from the frying drum, the frying drum being subsequently filled again from its front face. Prior to filling, however, the frying drum has to be cleaned in order to maintain the device in a hygienically perfect condition and this implies a considerable expenditure of time and labour, with the additional danger of losing cooking fat due to the replacement.

SUMMARY OF THE INVENTION

Basing itself on this, the invention set itself the object of designing a frying device in such a manner that the cooking fat can be replaced quickly and without risking an unintentional loss of cooking fat. According to the invention, this object is attained by means of the characteristic features of Claim 1 hereinbelow.

Further advantageous embodiments of the inventive solution in accordance with Claim 1 derive from the characteristics of the claims that follow Claim 1.

BRIEF DESCRIPTION OF THE DRAWINGS

Further advantages, characteristics and details of the invention are illustrated by the following description of a preferred embodiment and the drawing, of which the various figures are as follows.

DETAILED DESCRIPTION OF THE PREFERRED EMBODIMENT(S)

Figure 1:
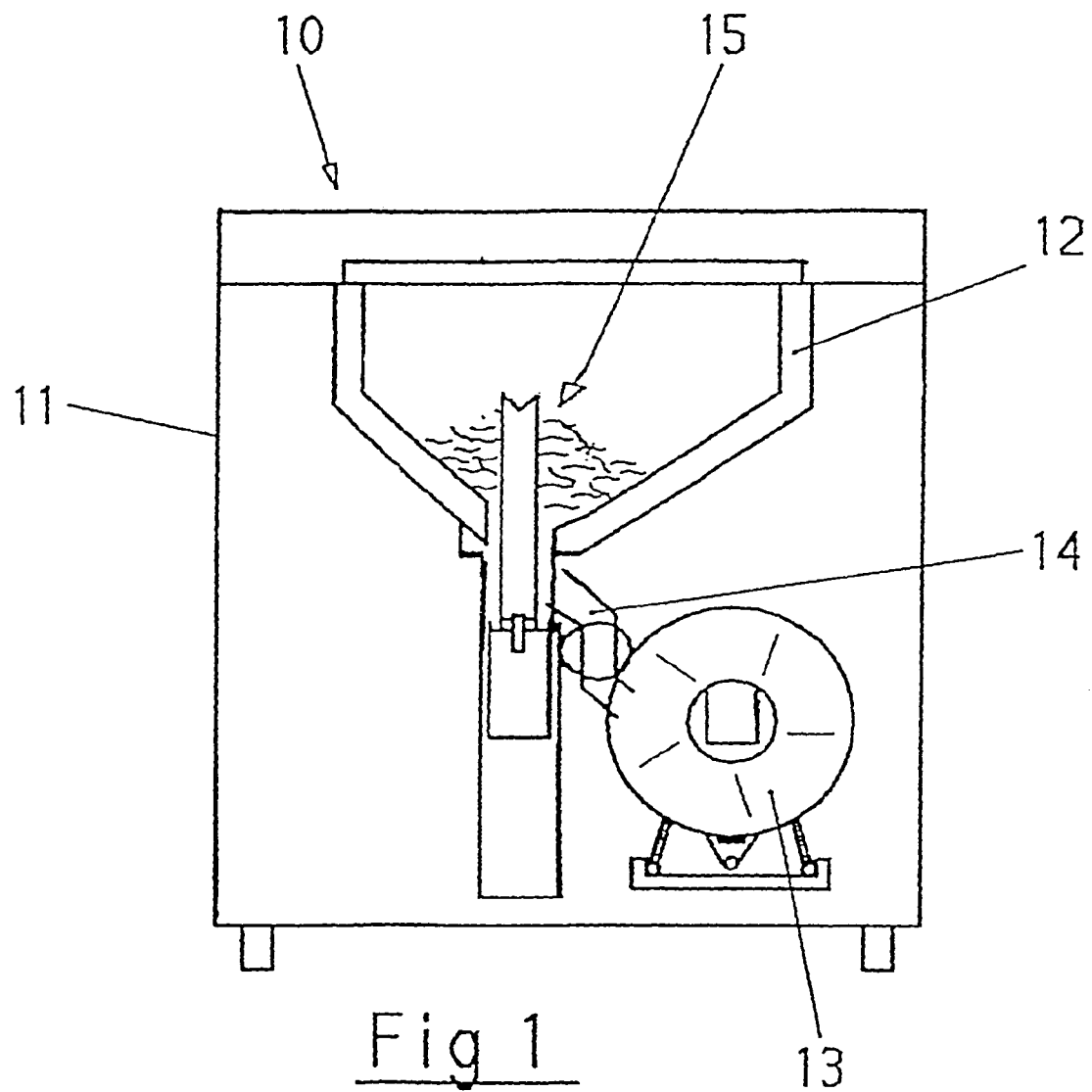
FIG. 1 shows a frying device equipped in accordance with the invention seen schematically as a front elevation and in section.

FIG. 1 shows a device for the cooking of foodstuff portions while swimming, hereinafter referred to as a frying device 10. The frying device 10 comprises a housing 11 that accommodates a frying material storage container 12 and the cooking device 13, which is connected to the storage container 12 by means of a transportation pipe 14. Utilizing appropriate means, a ladling pipe 15 for example, portions are measured in the storage container 12, fed into the transportation pipe 14 and from there introduced into the cooking device 13, the portions being then removed from the cooking device 13 after the cooking has been completed.

Figure 2:
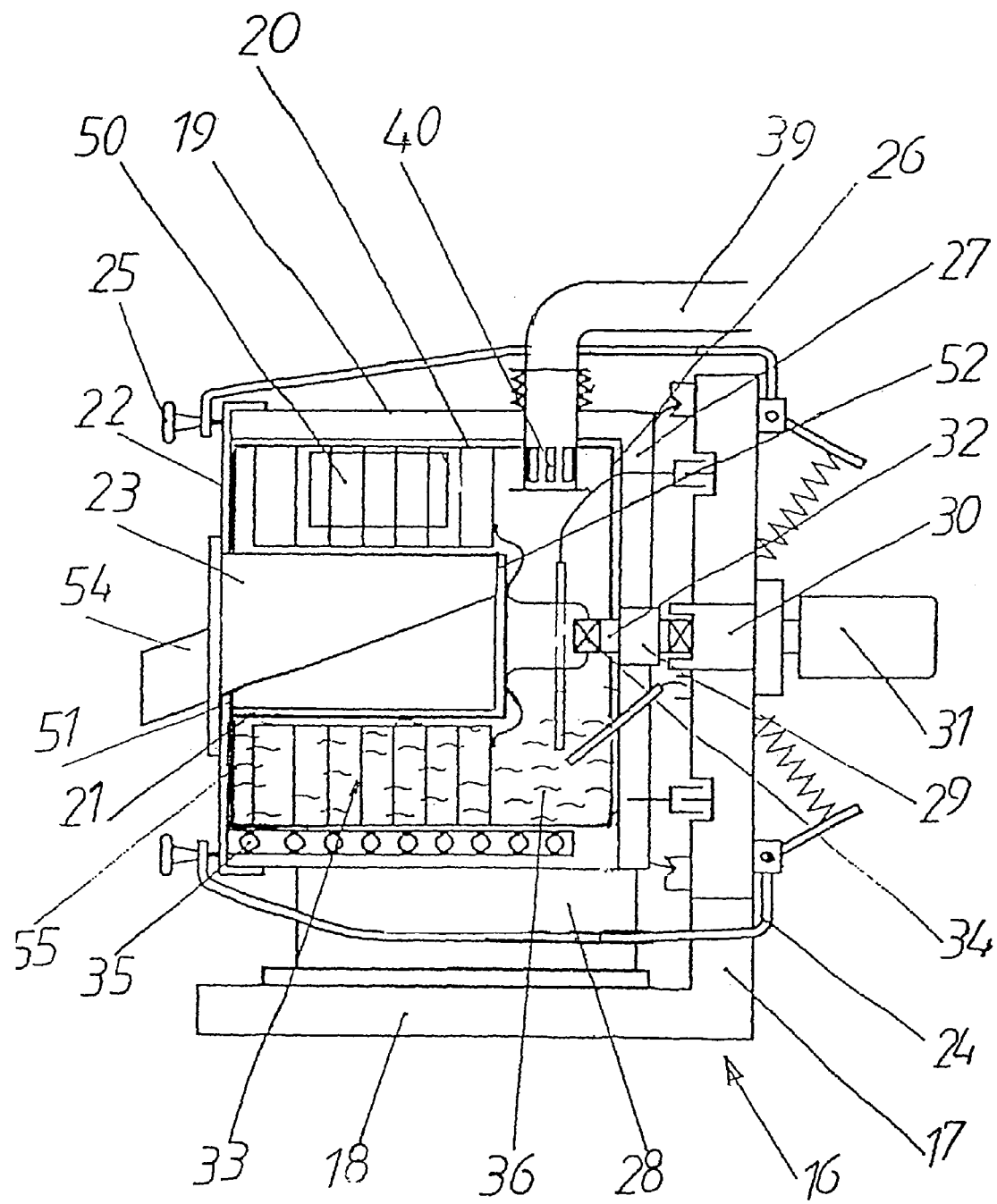
FIG. 2 shows a frying device in accordance with FIG. 1 in side elevation and in section.
Figure 3:
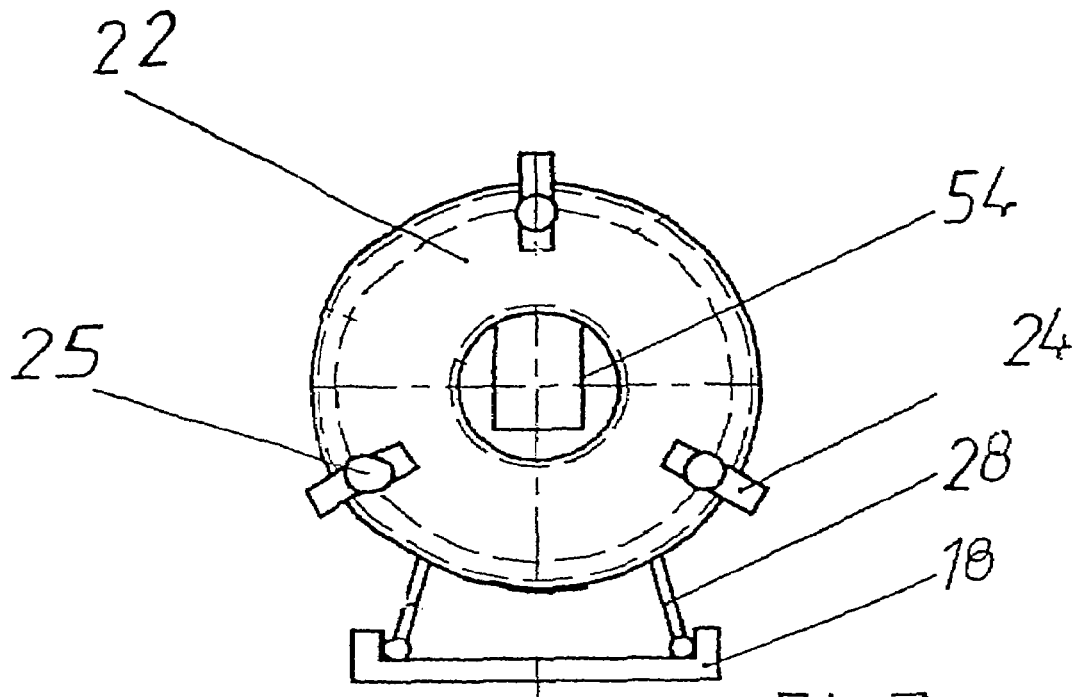
FIG. 3 shows a front elevation of a frying drum.
Figure 4:
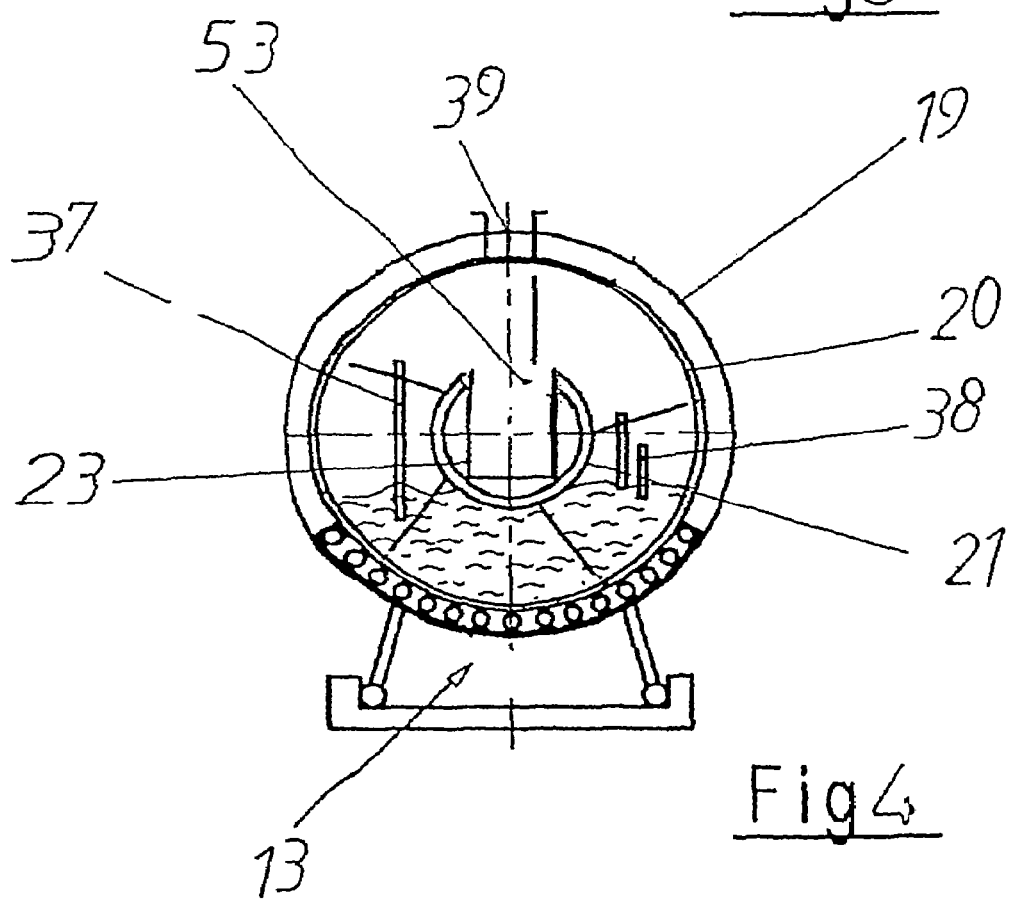
FIG. 4 shows a vertical section of the frying drum in accordance with FIG. 3.

FIG. 2 shows a longitudinal section of a cooking device 13 designed in accordance with the invention. The cooking device 13 comprises an L-shaped supporting frame 16 with a vertical limb 17 and a horizontal limb 18. The horizontal limb 18 supports three drums 19, 20, 21, namely the service drum 19, the frying drum 20 and the discharge drum 21. The service drum 19 is designed as a sheath closed at one end and open at the other end that accommodates the frying drum 20 with the discharge drum 21, which are slid into it. The open end of the service drum 19 is closed with a cover 22 that renders the frying drum 20 with the discharge drum 21 incapable of being displaced in the axial direction. A conveyor chute (slide) 23 is provided in the discharge drum 21 that has its downstream end passing through the cover 22. The cover 22 is pressed against the open end face of the service drum 19 by preferably three swivelling clamps 24 that have one end mounted by means of a swivel joint on the vertical limb 17, while their other ends press the cover 22 against the ring-shaped end face of the service drum by means of screws 25. The service drum 19 is joined to the horizontal limb 18 by means of stays 28. An output shaft 29 passes through the centre of the bottom 26 of the frying drum 20 and the bottom of the service drum 19 and on the side of the vertical limb 17 is joined to the driving shaft 30 of an electrical motor 31 that passes through the vertical limb 17. The free shaft stump 32 that projects free into the frying drum 20 is joined by means of a plug-in coupling to the agitator 33, which rotates around the fixed discharge drum 21.

Inserted in the circumferential wall of the service drum 19, preferably in its lower half running parallel to the horizontal limb 18, there is an electrical heating unit 35 that brings the cooking fat 36 in the frying drum 20 to a certain temperature and maintains it there. The state of filling of the frying drum 20 and the temperature of the liquid cooking fat 36 are monitored by means of an oil gauge 37 and thermostats 38.

Figure 5:
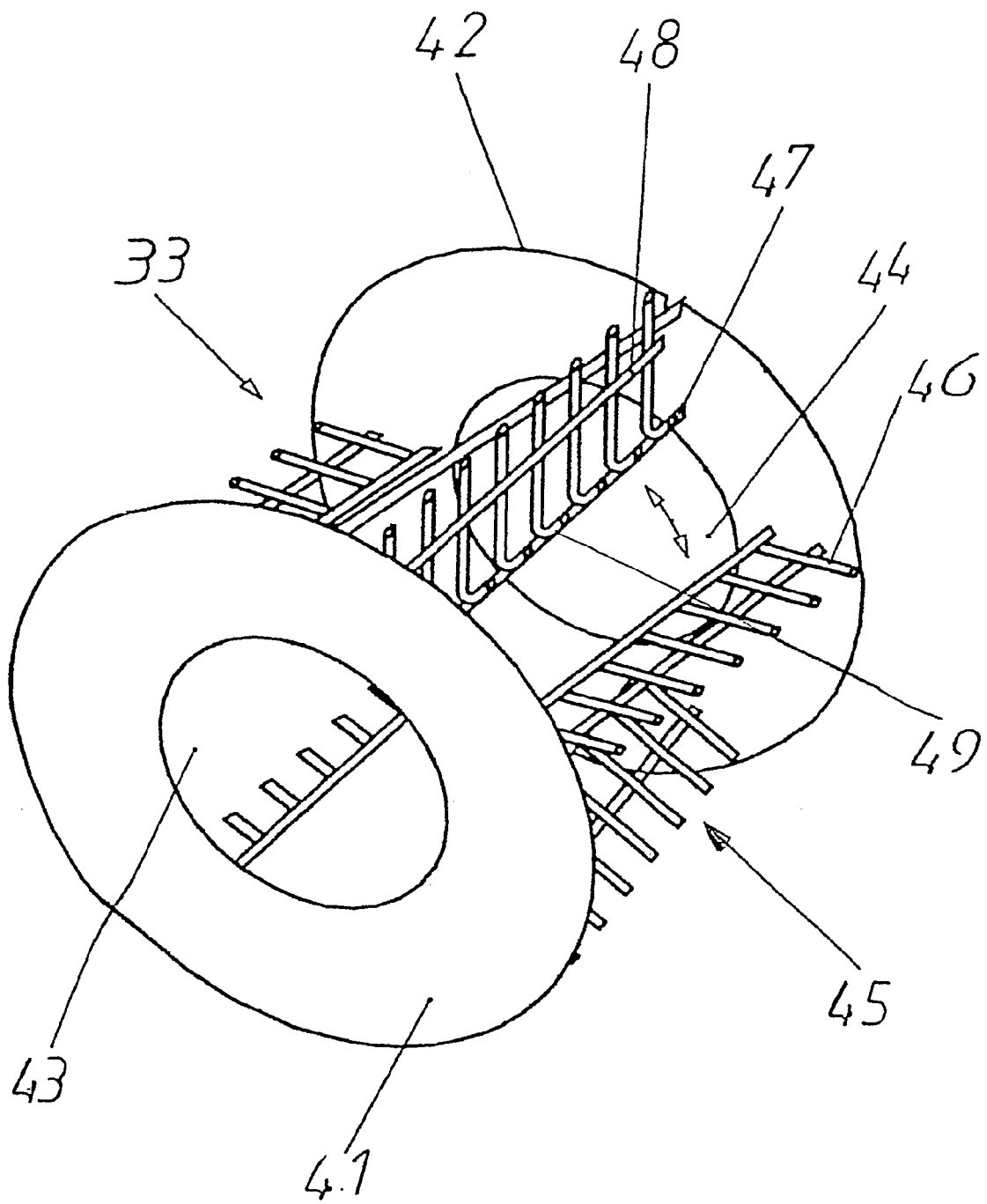
FIG. 5 shows a perspective view of an agitator.

The frying drum 20, which is designed as a hollow cylinder closed on all sides, is provided with a discharge pipe 39 by means of which evaporated cooking fat 36 and other volatile evaporation products are removed from the frying drum 20. The discharge pipe 39 with its inlet end 40 is displaceably embedded in the circumferential wall of the service drum 19 and that of the frying drum 20. When the frying drum 20 has to be exchanged, the discharge pipe 39 is pulled back until its free end has passed through the circumferential wall of the frying drum 20 and has thus released the frying drum 20 for an axial displacement. Preferably, the discharge pipe 39 is embedded in the circumferential walls of the frying drum 20 and the service drum 19 at the uppermost point of a vertical with respect to the horizontal limb 18. According to FIG. 5, the agitator 33 attached by means of the plug-in coupling to the shaft stump 32 consists of two rings 41, 42 that are separated by a certain axial distance. The outer diameter of the rings 41, 42 corresponds more or less to the internal diameter of the frying drum 20, so that the rings 41, 42 can rotate within the frying drum 20. The diameter of the central openings 43, 44 is slightly greater than the outer diameter of the discharge drum 21, so that the rings 41, 42 can rotate within the frying drum 20 and around the discharge drum 21. Between the rings 41, 42 there are provided at least two and preferably five firmly attached grids 45. The grids 45 consist of rods 46 arranged at a certain distance next to each other that run at right angles to the longitudinal axis of the agitator 33 and are joined together by means of an inner carrier bar 47 and an outer carrier bar 48. The inner carrier bar is situated close to the outer circumference of the central opening of the rings 41, 42, while the outer carrier bar 48 is situated close to the outer circumference of the rings 41, 42. The ends of the rods 46 attached to the inner carrier bar 47 are bent into hooks 49 in the form of a V with a bottom radius that project from the inner carrier bar 47. The circumferential walls of the service drum 19 and the frying drum 20 are provided with inlet openings in corresponding positions for feeding the frying drum 20 and the transportation pipe 14 terminates in these inlet openings.

Contained in the frying drum 20 is the discharge drum 21, which is arranged in an axially concentric position with respect to the frying drum 20. The discharge drum 21 is a hollow cylinder closed on both sides by face walls 51, 52. In the longitudinal direction, running from one face wall 51, 52 to the other, there is provided a slit-shaped recess 53 that passes through the circumferential wall. The recess 53 terminates on the box-shaped conveyor chute 23 arranged in the interior of the discharge drum 21. The conveyor is U-shaped in cross section and the upstanding parallel limbs of its profile are attached to the interior surface of the discharge drum 21, so that no fried material falling through the inlet opening 50 onto the conveyor chute 23 can reach the interior of the discharge drum 21. The conveyor chute 23 runs to the periphery surface of the discharge drum 21 in the direction of its forward end face 51, is inclined downwards and passes through the forward end face 51 with a prolongation 54 that projects at an angle from the forward end face 51. All parts of the discharge drum 21, namely the forward end face 51 and the rearward end face 52, the pipe extending between them and the conveyor chute 23, are detachably attached to each other, so that the discharge drum 21 can be readily taken apart and then put together again. The forward end face 51 of the discharge drum 23 is arranged concentrically with respect to the frying drum and is detachably attached to the inside (side facing the interior) of its cover 55, with the prolongation 54 of the conveyor chute 23 passing also through the covers 22 and 55 when in the assembled state.

What has been said above makes it clear that the frying device 10 can be maintained ready for operation in a simple and quick manner. When the cooking fat 36 has to be replaced, the screws 25 are loosened and the swivelling clamps 24 are pulled away from the cover 22. Subsequently, the cover 22 is removed from the service drum 19, so that the frying drum 20 with the exhausted cooking fat, following the sliding out of the discharge pipe 39 and the detachment of the plug-in coupling 34, can be pulled out of the service drum 19 as a unit and replaced by sliding a frying drum 20 with as yet unused cooking fat into the service drum 19. The frying drum 20 is fixed in position in the service drum 19 by putting on the cover 22, bringing the swivelling clamps back into position and tightening the screws 25, and is therefore ready for operation after the connection of the discharge pipe 39 and the drive 31. With the exception of the connection for the discharge pipe 39, the frying drum 20 is closed on all sides. Since the level does not reach up to the connection opening for the discharge pipe 39, this opening—which can also be closed—does not interfere with fat-loss-free handling of the frying drum 20 when it has to be changed. A frying drum 20 of the described design assures that on the occasion of its replacement the interior of the service drum 19 can be maintained in a hygienically perfect condition with simple means and without great loss of time, and that a loss of cooking fat through the practically closed frying drum 20 that would soil the frying device or the place where it is installed can be excluded. Just like the discharge drum 21, the frying drum 20 is made up of parts that are detachably joined together and, as such, are easy to clean. Due to the manner in which the frying drum is incorporated in the service drum, the invention assures a simple and quick installation and dismantlement of the frying drum and, due to its being closed on all sides, installation and/or replacement without loss of fat. The invention also assures that a frying drum that is closed on all sides with respect to the level to which it is filled with cooking fat can be easily decomposed for the purpose of cleaning its component parts.

The inlet opening 50 is closed on the inside of the frying drum 20 by a flap that can be swiveled by means of a hinge (not shown). The flap can be kept in its closed position by means of spring pressure, for example. The inlet opening 50 is opened by new portions descending through the transportation pipe 14 that push the flap upwards. After the portion has passed, the flap returns to its closed position. The flap assures that no oxygen can enter the frying drum in case the frying fat should catch fire. In normal operation, on the other hand, the flap prevents evaporated frying fat from rising in the direction of the storage container 12. The prolongation 54 of the conveyor chute 23 is covered by a closure 56 having a U-shape similar to the cross section of the conveyor chute 23. Depending on its actual size, the closure 56 may either cover the prolongation 54 or swivel into it, so that the downstream end (front face) of the prolongation 54 and the longitudinal open surface of the prolongation 54 are closed. The closure 56 is hinged to the downstream end face of the discharge drum 21 that is passed by the conveyor chute 23. It is opened and closed by a drive (not shown) that may be operated by electric, hydraulic or pneumatic means. The closure 56 is opened when fried material is removed from the discharge drum, otherwise the prolongation remains closed. The closure 56 makes it impossible for evaporated frying fat to escape from the frying drum 20 into the environment via the discharge drum 21; the closure 56 also prevents material being placed in the frying fat from outside and, in the event of fire, the entry of oxygen. In the discharge pipe 39 there is arranged a valve 58 that remains open in normal operation, but automatically clauses if a fire should break out, so that the oxygen supply via the discharge pipe will become interrupted.

The invention claimed is:

1. A frying device for cooking foodstuffs, comprising:
   a service drum;
   a unit comprising a frying drum designed as a hollow cylinder having a horizontal axis and being closed on all sides, containing liquefied cooking fat, and a discharge drum having a discharging conveyor chute, arranged coaxial within the frying drum and being attached to a cover of the frying drum;
   said unit being accommodated in the service drum in such a manner as to be removable from the service drum by axial displacement;
   a motor;
   a revolving agitator accommodated in the frying drum, connected to the motor and rotatable around the fixed discharge drum, conveying cooked portions onto a conveyor chute when driven by the motor;
   a storage container for foodstuffs to be cooked; and
   a transportation pipe connecting the frying drum to the storage container for supplying the frying drum with portions of the foodstuffs.

2. A frying device in accordance with claim 1, wherein the agitator is connected by means of a plug-in coupling to a driving shaft.

3. A frying device in accordance with claim 1, wherein the discharge drum is provided with a slit-shaped recess with a conveyor chute that continues the recess.

4. A frying device in accordance with claim 3, wherein the unit is designed to be decomposable into the frying drum and the discharge drum.

5. A frying device in accordance with claim 4, wherein the discharge drum is designed to be decomposable into its component parts.

6. A frying device in accordance with claim 4, wherein the frying drum is designed to be decomposable into its component parts.

7. A frying device in accordance with claim 3, wherein the conveyor chute has a U-shaped profile.

8. A frying device in accordance with claim 7, wherein parallel limbs of the U-shaped profile engage with an inner surface of a pipe-shaped part of the discharge drum.

9. A frying device in accordance with claim 3, wherein said conveyor chute is downwardly inclined and a prolongation of the downwardly inclined conveyor chute passes through the cover of the frying drum and a cover of the service drum.

* * * * *

UNITED STATES PATENT AND TRADEMARK OFFICE
CERTIFICATE OF CORRECTION

PATENT NO.        : 7,617,765 B2                                    Page 1 of 1
APPLICATION NO.   : 10/523962
DATED             : November 17, 2009
INVENTOR(S)       : Ulrich Maurer It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 581 days.

Signed and Sealed this

Fourteenth Day of December, 2010

David J. Kappos
*Director of the United States Patent and Trademark Office*